(12) United States Patent
Taylor et al.

(10) Patent No.: US 12,491,751 B2
(45) Date of Patent: Dec. 9, 2025

(54) HVAC SYSTEM

(71) Applicants: DENSO International America, Inc., Southfield, MI (US); DENSO CORPORATION, Kariya (JP)

(72) Inventors: Dwayne Taylor, Livonia, MI (US); Matt Filipkowski, Lake Orion, MI (US); Mika Gocho, Ann Arbor, MI (US); Aaron Compton, Pinckney, MI (US); Brian Belanger, Rochester Hills, MI (US); Jonathan Noah-Navarro, Royal Oak, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 195 days.

(21) Appl. No.: 18/236,510

(22) Filed: Aug. 22, 2023

(65) Prior Publication Data

US 2023/0391161 A1    Dec. 7, 2023

Related U.S. Application Data

(63) Continuation-in-part of application No. 17/941,396, filed on Sep. 9, 2022.

(60) Provisional application No. 63/362,215, filed on Mar. 31, 2022, provisional application No. 63/268,538, filed on Feb. 25, 2022.

(51) Int. Cl.
*B60H 1/00* (2006.01)
*B60H 1/32* (2006.01)

(52) U.S. Cl.
CPC ..... *B60H 1/00485* (2013.01); *B60H 1/00028* (2013.01); *B60H 1/3228* (2019.05)

(58) Field of Classification Search
CPC ........... B60H 1/00485; B60H 1/00885; B60H 1/00028; B60H 1/3228; B60H 1/00928; B60H 1/00328; B60H 1/00899; B60H 1/32284
See application file for complete search history.

(56) References Cited

U.S. PATENT DOCUMENTS

| 10,371,419 B2 | 8/2019 | Enomoto et al. |
| 2017/0050493 A1 | 2/2017 | Nishikawa et al. |

(Continued)

FOREIGN PATENT DOCUMENTS

| JP | 2003211935 A | 7/2003 |
| JP | 2022079169 A | 5/2022 |
| WO | 2020175854 A1 | 9/2020 |

*Primary Examiner* — Marc E Norman
(74) *Attorney, Agent, or Firm* — Harness, Dickey & Pierce, P.L.C.

(57) ABSTRACT

An HVAC system including an evaporator, a condenser, an expansion valve, and a compressor. An HVAC case includes a first heat exchanger having a first height, a second heat exchanger having a second height that is greater than the first height, and an air mix door movable to direct airflow from the second heat exchanger to the first heat exchanger or around the first heat exchanger. In a maximum hot mode, a valve system directs the coolant through the condenser, the first heat exchanger, and the second heat exchanger, and the air mix door directs airflow from the second heat exchanger to the first heat exchanger. In a maximum cold mode, the valve system directs the coolant through the evaporator, the first heat exchanger, and the second heat exchanger.

19 Claims, 12 Drawing Sheets

(56) References Cited

U.S. PATENT DOCUMENTS

| | | |
|---|---|---|
| 2018/0202697 A1 | 7/2018 | Huenemoerder |
| 2018/0312035 A1 | 11/2018 | Koberstein et al. |
| 2018/0354344 A1 | 12/2018 | Miura et al. |
| 2022/0134845 A1 | 5/2022 | Keon et al. |
| 2023/0415547 A1* | 12/2023 | Tanabe ............... B60H 1/00885 |
| 2025/0018771 A1* | 1/2025 | Morishita ............... B60H 1/22 |

* cited by examiner

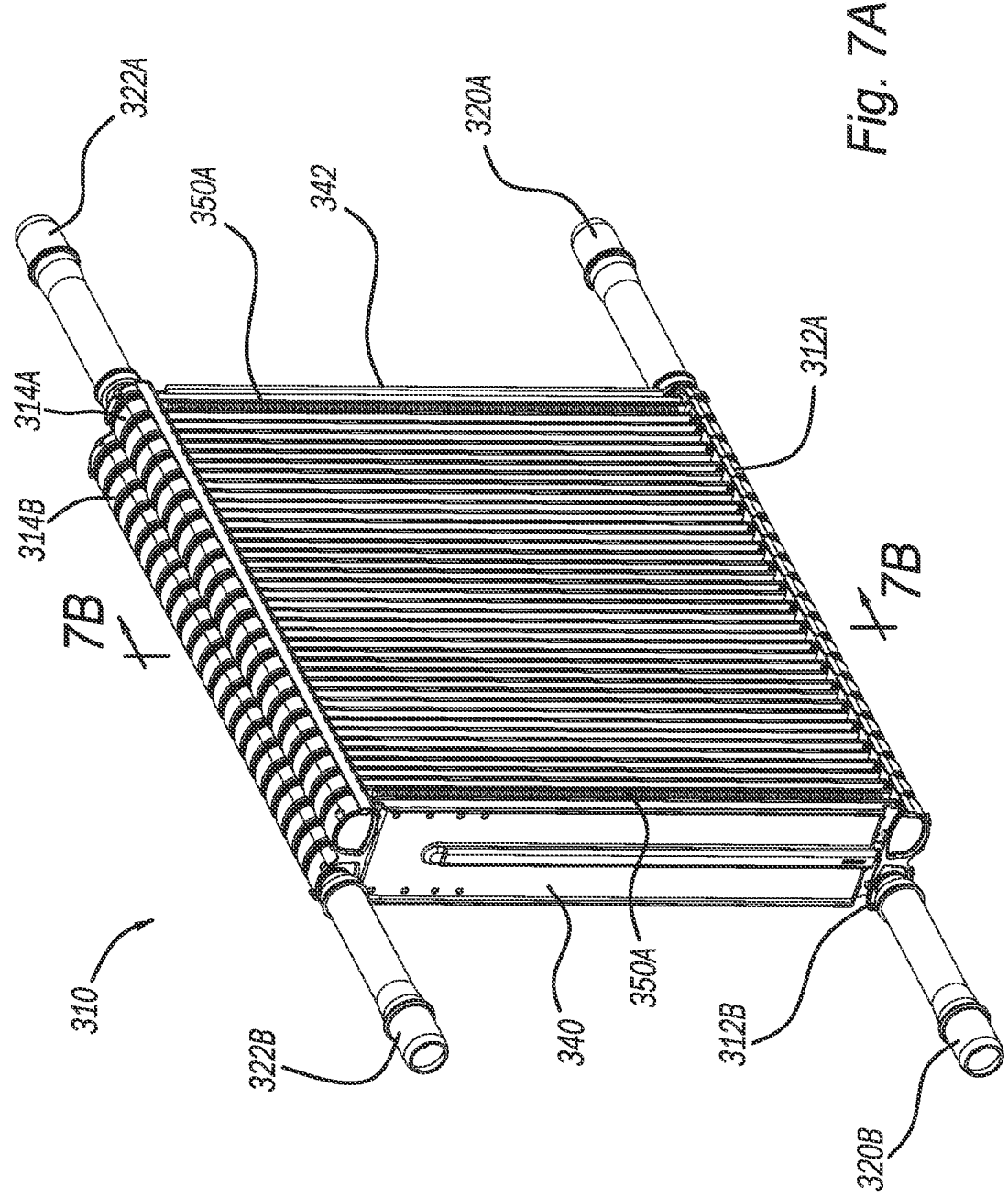

// HVAC SYSTEM

CROSS-REFERENCE TO RELATED APPLICATIONS

This application is a continuation-in-part of U.S. patent application Ser. No. 17/941,396, which was filed on Sep. 9, 2022. This application claims the benefit of U.S. Provisional Application No. 63/268,538 filed on Feb. 25, 2022, and U.S. Provisional Application No. 63/362,215 filed on Mar. 31, 2022. The entire disclosures of each of the above-referenced applications are incorporated herein by reference.

FIELD

The present disclosure relates to a heating, ventilation, and air conditioning (HVAC) system, such as a secondary loop HVAC system.

BACKGROUND

This section provides background information related to the present disclosure, which is not necessarily prior art.

Heating, ventilation, and air conditioning (HVAC) systems are widely used to condition the air of various environments, such as vehicle passenger cabins. While existing HVAC systems are suitable for their intended use, they are subject to improvement. For example, an HVAC system that is more efficient and less complex than existing HVAC systems would be desirable. The present disclosure includes an improved HVAC system as described in detail herein.

SUMMARY

This section provides a general summary of the disclosure, and is not a comprehensive disclosure of its full scope or all of its features.

The present disclosure includes a secondary loop HVAC system having an evaporator, a condenser, an expansion valve, and a compressor. A refrigerant loop is in fluid communication with each of the evaporator, the condenser, and the expansion valve. An HVAC case includes a first heat exchanger having a first height, a second heat exchanger having a second height that is greater than the first height, and an air mix door between the first heat exchanger and the second heat exchanger movable to direct airflow from the second heat exchanger to the first heat exchanger or around the first heat exchanger. A first coolant loop is in fluid communication with the first heat exchanger, the second heat exchanger, and either the evaporator or the condenser. A valve system is configured to control flow of the coolant through the first coolant loop. In a maximum hot heating mode, the valve system is configured to direct the coolant through the condenser, the first heat exchanger, and the second heat exchanger, and the air mix door is positioned to direct all airflow from the second heat exchanger to the first heat exchanger. In a maximum cold cooling mode, the valve system is configured to direct the coolant through the evaporator, the first heat exchanger, and the second heat exchanger.

The present disclosure further includes a secondary loop heating, ventilation, and air conditioning (HVAC) system including an evaporator, a condenser, an expansion valve, and a compressor. A refrigerant loop is in fluid communication with each of the evaporator, the condenser, and the expansion valve for circulating refrigerant therethrough. An HVAC case includes a first heat exchanger, a second heat exchanger, and a heater downstream of both the first heat exchanger and the second heat exchanger. A first coolant loop is in fluid communication with the first heat exchanger, the second heat exchanger, and either the evaporator or the condenser for circulating coolant therethrough. A valve system is configured to control flow of the coolant through the first coolant loop. In a heating, dehumidify, and defog mode, the valve system is configured to direct coolant from the condenser through the first heat exchanger and back to the condenser, and from the evaporator through the second heat exchanger and back to the evaporator. In a cooling, dehumidify, and temperature control mode the valve system is configured to direct coolant from the condenser through first heat exchanger and back to the condenser, and from the evaporator through the second heat exchanger and back to the evaporator. The heater is configured to heat airflow from the first heat exchanger to provide temperature control.

The present disclosure also includes a secondary loop heating, ventilation, and air conditioning (HVAC) system including an evaporator, a condenser, an expansion valve, and a compressor. A refrigerant loop is in fluid communication with each of the evaporator, the condenser, and the expansion valve for circulating refrigerant therethrough. An HVAC case includes a first heat exchanger and a second heat exchanger. The HVAC case defines a face outlet, a foot outlet, and a defrost outlet. A first coolant loop is in fluid communication with the first heat exchanger, the second heat exchanger, and either the evaporator or the condenser for circulating coolant therethrough. A second coolant loop is in fluid communication with a radiator and either the evaporator or the condenser to direct the coolant through the radiator. A valve system is configured to control flow of the coolant through the first coolant loop and the second coolant loop. In a maximum hot heating mode the valve system configures the first coolant loop to run through the condenser, the first heat exchanger, and the second heat exchanger, and configures the second coolant loop to run through the radiator and the evaporator. In a maximum cold cooling mode the valve system configures the first coolant loop to run through the evaporator, the first heat exchanger, and the second heat exchanger, and configures the second coolant loop to run through the radiator and the condenser.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7A is a perspective view of an exemplary dual zone heat exchanger in accordance with the present disclosure;

Corresponding reference numerals indicate corresponding parts throughout the several views of the drawings.

DETAILED DESCRIPTION

Figure 1:
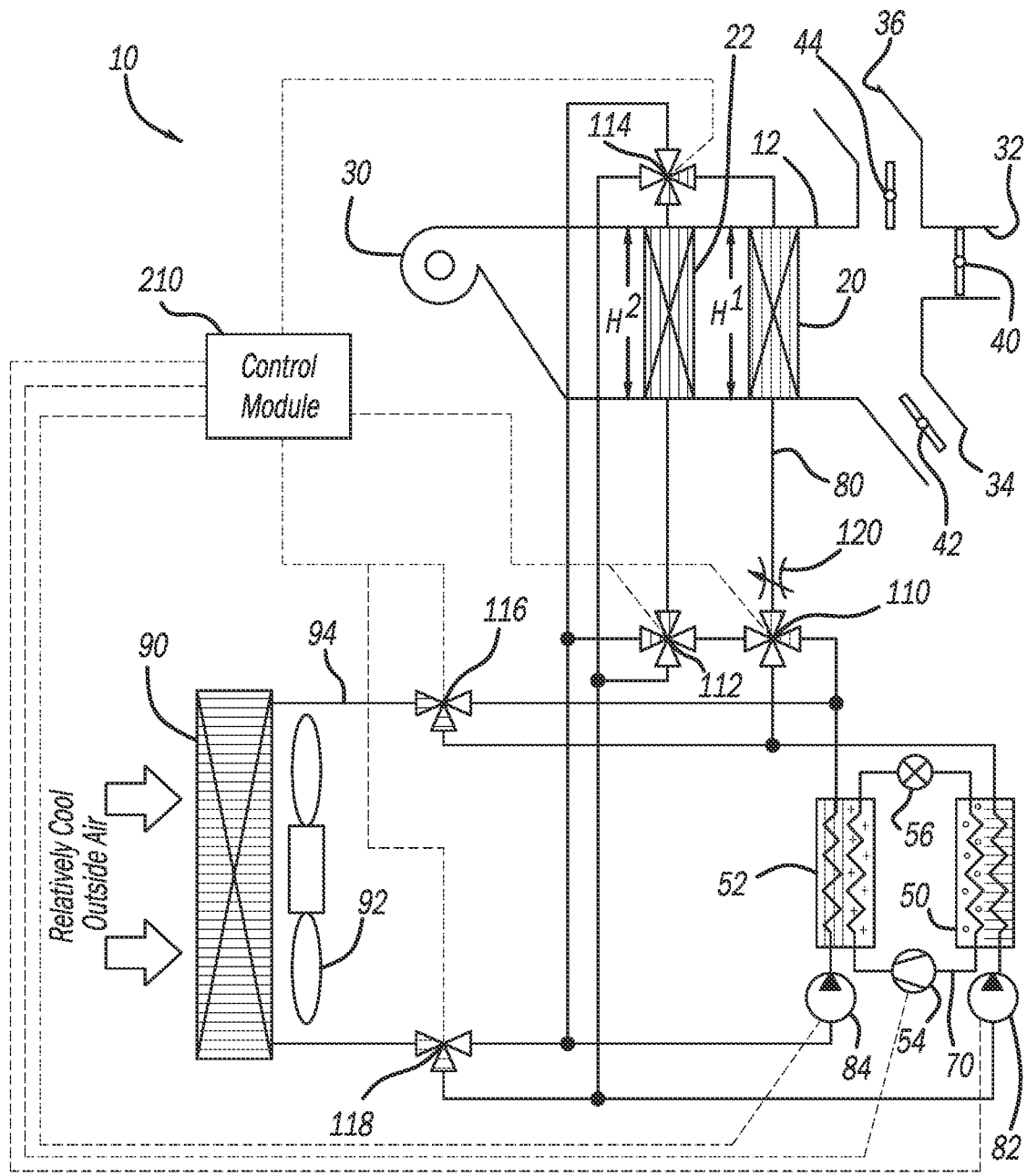
FIG. 1 illustrates an exemplary secondary loop heating, ventilation, and air conditioning (HVAC) system in accordance with the present disclosure in a maximum hot heating mode.

Example embodiments will now be described more fully with reference to the accompanying drawings.

Throughout the present disclosure, the term "refrigerant" is used in accordance with the definitions published by the American Society of Heating, Refrigeration, and Air Conditioning Engineers ("ASHRAE Terminology"), which defines "refrigerant" as follows: "The fluid used for heat transfer in a refrigerating system, which absorbs heat at a low temperature and a low pressure of the fluid and rejects heat at a higher temperature and a higher pressure of the fluid, usually involving changes of the state of the fluid."

Throughout the present disclosure, the term "coolant" is used in accordance with the definitions published by the American Society of Heating, Refrigeration, and Air Conditioning Engineers ("ASHRAE Terminology"), which defines "coolant" as follows: "a single-phase fluid . . . used for transferring heat from one place to another."

With initial reference to FIGS. 1-6, a secondary loop heating, ventilation, and air conditioning (HVAC) system in accordance with the present disclosure is illustrated at reference numeral 10. The HVAC system 10 includes an HVAC case 12. The HVAC case 12 is configured to be mounted at any suitable location for conditioning the air of any suitable environment. In the illustrated examples, the HVAC case 12 is particularly configured for conditioning air of a passenger cabin of any suitable vehicle. Suitable vehicles include, but are not limited to, passenger vehicles, mass transit vehicles, construction vehicles/equipment, commercial vehicles, military vehicles/equipment, watercraft, aircraft, etc.

Housed within the HVAC case 12 is a first heat exchanger 20 and a second heat exchanger 22. Airflow is generated by any suitable blower 30. The HVAC case 12 is configured to direct airflow generated by the blower 30 across each of the first and the second heat exchangers 20, 22. Airflow exits the HVAC case 12 through one or more of a face outlet 32, a foot outlet 34, and/or a defrost outlet 36 defined by the HVAC case 12. Airflow exiting the HVAC case 12 through the outlets 32, 34, and 36 is controlled by a face outlet control door 40, a foot outlet control door 42, and a defrost outlet control door 44 respectively.

The first heat exchanger 20 has a first height $H^1$, which extends perpendicular to a first length of the first heat exchanger 20. The second heat exchanger 22 has a second height $H^2$, which extends perpendicular to a second length of the second heat exchanger 22. The first and second heat exchangers 20, 22 are oriented in the HVAC case 12 such that the first height $H^1$ of the first heat exchanger 20 extends parallel to the second height $H^2$ of the second heat exchanger 22. The first length of the first heat exchanger 20 extends parallel to the second length of the second heat exchanger 22. Thus, the first and second heat exchangers 20, 22 are mounted at the same orientation within the HVAC case 12. The first heat exchanger 20 and the second heat exchanger 22 have the same size. Thus, the first height $H^1$, the first length, and a first width of the first heat exchanger 20 is the same as the second height $H^2$, the second length, and a second width of the second heat exchanger 22. The first and second heat exchangers 20, 22 also have the same surface area.

The HVAC system 10 further includes an evaporator 50 and a condenser 52. In the example illustrated, the evaporator 50 and the condenser 52 are outside of the HVAC case 12. The evaporator 50 may be any suitable evaporator, such as a water-cooled chiller. The condenser 52 may be any suitable condenser, such as a water-cooled condenser. The evaporator 50 and the condenser 52 are in fluid communication with a compressor 54 and an expansion valve 56 by way of a refrigerant loop 70. The refrigerant loop 70 includes any suitable piping or other conduit configured to transport any suitable refrigerant through each of the evaporator 50, the compressor 54, the condenser 52, and the expansion valve 56.

The HVAC system 10 further includes a first coolant loop 80. The first coolant loop 80 includes any suitable conduit, such as piping, for circulating coolant. The first coolant loop 80 is in fluid communication with, and thus configured to circulate coolant through, the first heat exchanger 20, the second heat exchanger 22, and either the evaporator 50 or the condenser 52. Coolant is pumped through the evaporator 50 by a pump 82, and coolant is pumped across the condenser 52 by a pump 84.

The HVAC system 10 further includes a radiator 90 and any suitable fan or other airflow circulation device 92. The radiator 90 is in fluid communication with a second coolant loop 94. The second coolant loop 94 includes any suitable conduit, such as piping, configured to transport coolant to and from the radiator 90, as well as across the evaporator 50 or the condenser 52 as described herein.

The HVAC system 10 includes a valve system configured to control flow of coolant through the first coolant loop 80 and the second coolant loop 94. The valve system may be configured to control coolant flow in any suitable manner, such as with a series of valves. In the example illustrated, the valve system includes a first valve 110, a second valve 112, a third valve 114, a fourth valve 116, and a fifth valve 118. The first valve 110 is upstream of the first heat exchanger 20 such that coolant flowing to the first heat exchanger 20 from the evaporator 50 or the condenser 52 passes through the first valve 110. The second valve 112 is in direct fluid communication with both the first valve 110 and the second heat exchanger 22. The third valve 114 is downstream of the first heat exchanger 20 such that coolant flowing from the first heat exchanger 20 may be directed by the third valve 114 through or around the second heat exchanger 22.

The fourth valve 116 and the fifth valve 118 control the flow of coolant to the radiator 90 from the evaporator 50 or the condenser 52. The valves 110, 112, 114, 116, and 118 are controlled in any suitable manner, such as by way of a control module 210. The control doors 40, 42, and 44 of the HVAC case 12 are also controlled by the control module 210. The speed of the compressor 54 the speeds of the pumps 82 and 84 are also controlled by the control module 210.

In this application, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module 210 described herein.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 210 is configured to set the HVAC system 10 in a plurality of different modes. For example, the control module 210 is configured to set the HVAC system 10 in a maximum hot heating mode (FIG. 1), a maximum cold cooling mode (FIG. 2), a heating, dehumidify, and defog mode (FIG. 3), or a cooling, dehumidify, temperature control mode (FIG. 4). For situations where coolant side pressure drop may be of concern, alternate embodiments of enhanced hot heating mode (FIG. 5) and enhanced cold cooling mode (FIG. 6) are also included.

For the maximum hot heating mode of FIG. 1, the control module 210 is configured to set the valves 110, 112, 114, 116, and 118 as illustrated in FIG. 1, so that hot coolant heated as a result of flowing across the condenser 52 flows across both the first heat exchanger 20 and the second heat exchanger 22 in series to heat airflow to the cabin through the foot outlet 34 and to a windshield through the defrost outlet 36. Between the valve 110 and the first heat exchanger 20 is a flow control device 120, which is any suitable flow control device configured to control the amount of coolant flow from the first valve 110 to the first heat exchanger 20. The flow control device 120 may be any suitable flow control valve, for example. The degree to which the flow control device 120 permits coolant flow to the first heat exchanger 20 is controllable by the control module 210. Using the flow control device 120 to increase or decrease the amount of coolant to the first heat exchanger 20 provides additional temperature control. For example, the temperature of the first heat exchanger 20 can be increased or decreased by respectively increasing or decreasing the flow of hot coolant to the first heat exchanger 20. After flowing across the second heat exchanger 22, the coolant is directed back to the condenser 52. In the maximum hot heating mode of FIG. 1, the valve system is configured to direct chilled coolant across the evaporator 50 and the radiator 90. Thus, in the maximum hot heating mode of FIG. 1, both the first heat exchanger 20 and the second heat exchanger 22 heat airflow passing therethrough. The speed of compressor 54 and the speeds of pumps 82 and 84 may also be controlled by control module 210 to contribute to maximum hot heating effect.

Figure 2:
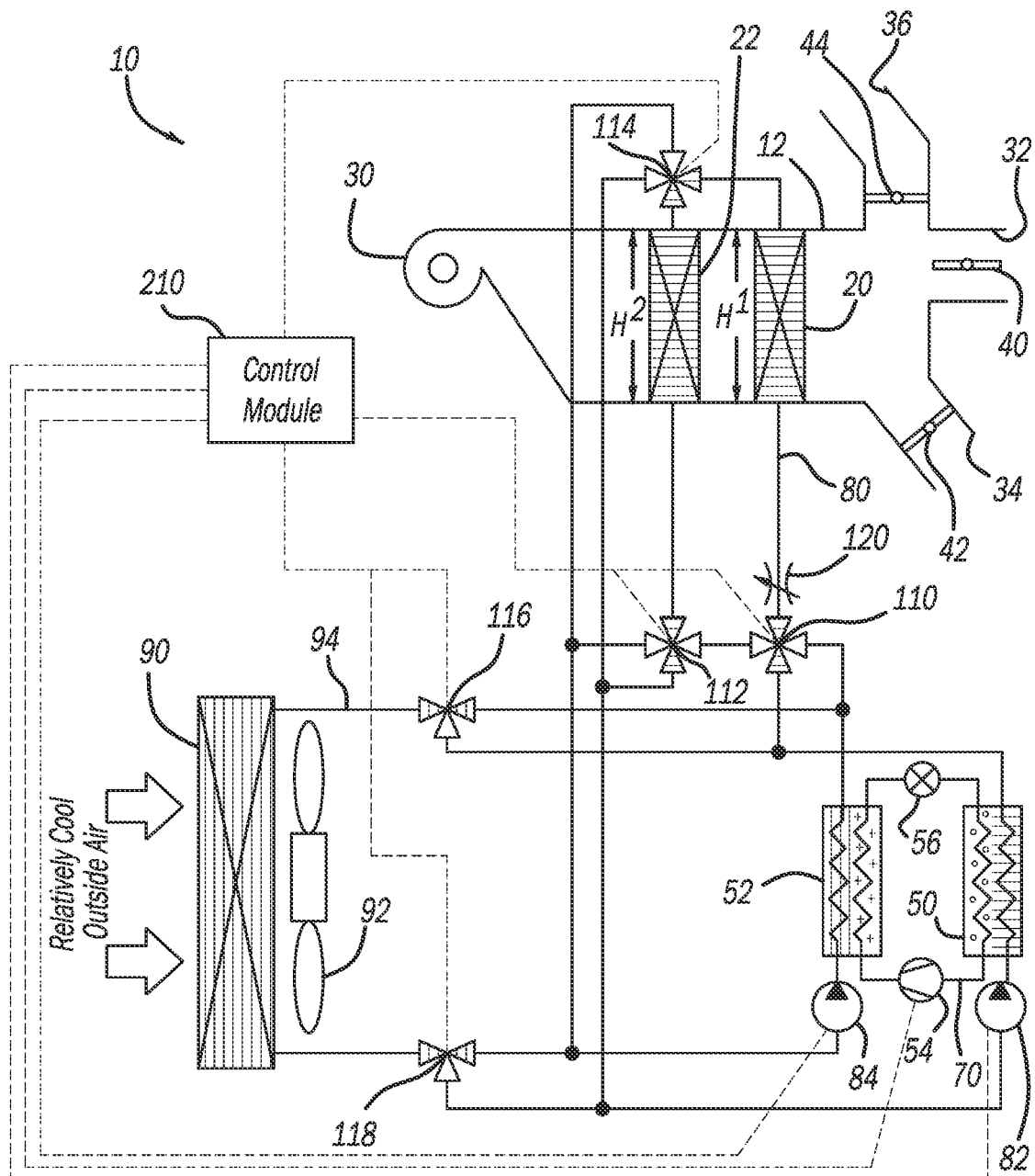
FIG. 2 illustrates the HVAC system of FIG. 1 in a maximum cold cooling mode.

For the maximum cold cooling mode of FIG. 2, the control module 210 is configured to set the valves 110, 112, 114, 116, and 118 as illustrated in FIG. 2. In the maximum cold cooling mode of FIG. 2, coolant that has been cooled by passing across the evaporator 50 is directed by the first valve 110 to and across the first heat exchanger 20. The flow control device 120 is configured to control the flow of coolant to the first heat exchanger 20. From the first heat exchanger 20, the cooled coolant is directed across the second heat exchanger 22 in series with the first heat exchanger 20 by the third valve 114. From the second heat exchanger 22, the second valve 112 directs the coolant back to the evaporator 50. The cold coolant flowing through the first and the second heat exchangers 20, 22 cools airflow to the cabin through the face outlet 32. The fourth and fifth valves 116, 118 are configured to direct coolant between the condenser 52 and the radiator 90. Thus, in the maximum cold cooling mode of FIG. 2, both the first heat exchanger 20 and the second heat exchanger 22 cool airflow directed across the first heat exchanger 20 and the second heat exchanger 22. The speed of compressor 54 and the speeds of the pumps 82 and 84 may also be controlled by control module 210 to contribute to maximum cold cooling effect.

Figure 3:
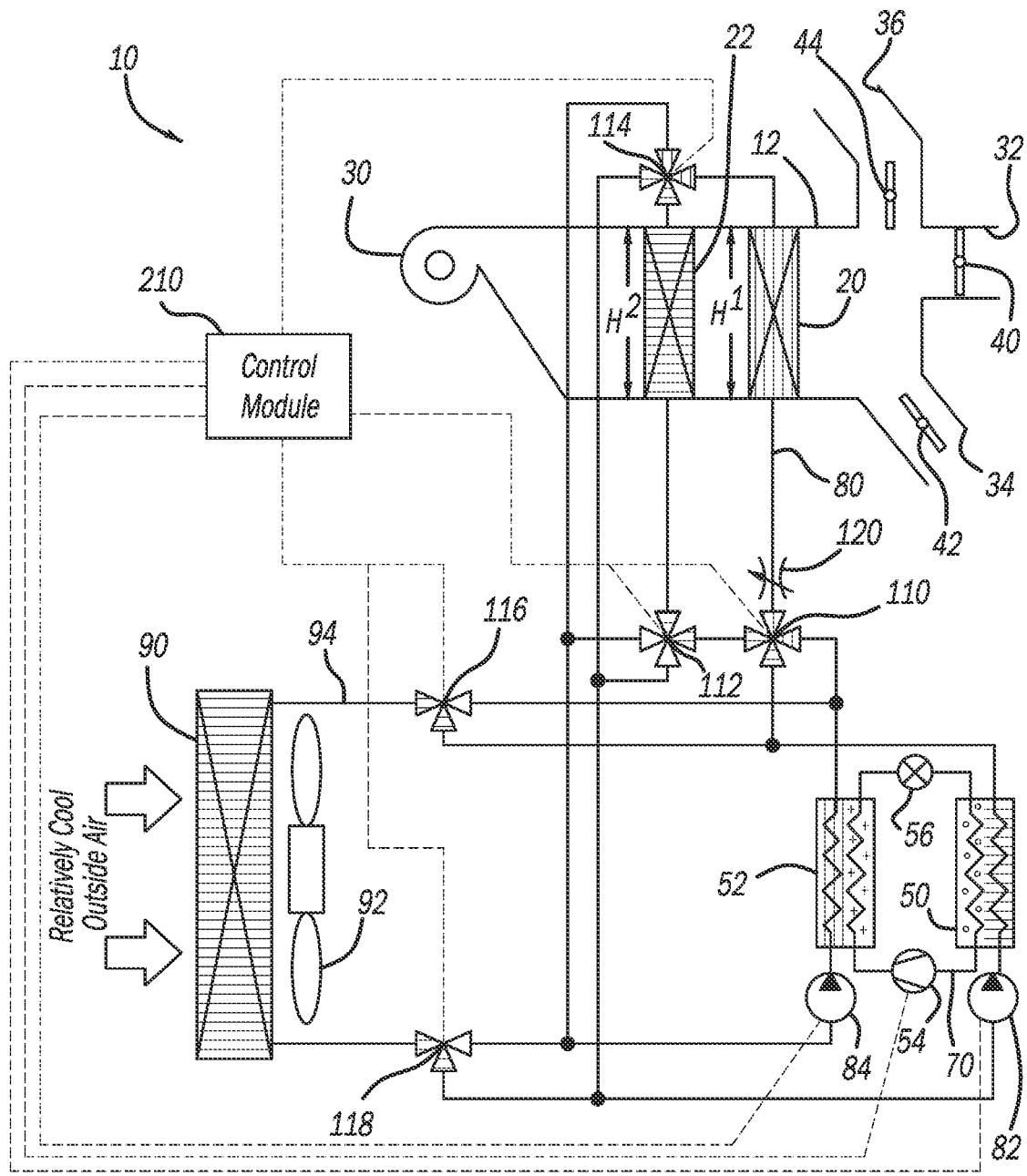
FIG. 3 illustrates the HVAC system of FIG. 1 in a heating, dehumidify, and defog mode.
Figure 4:
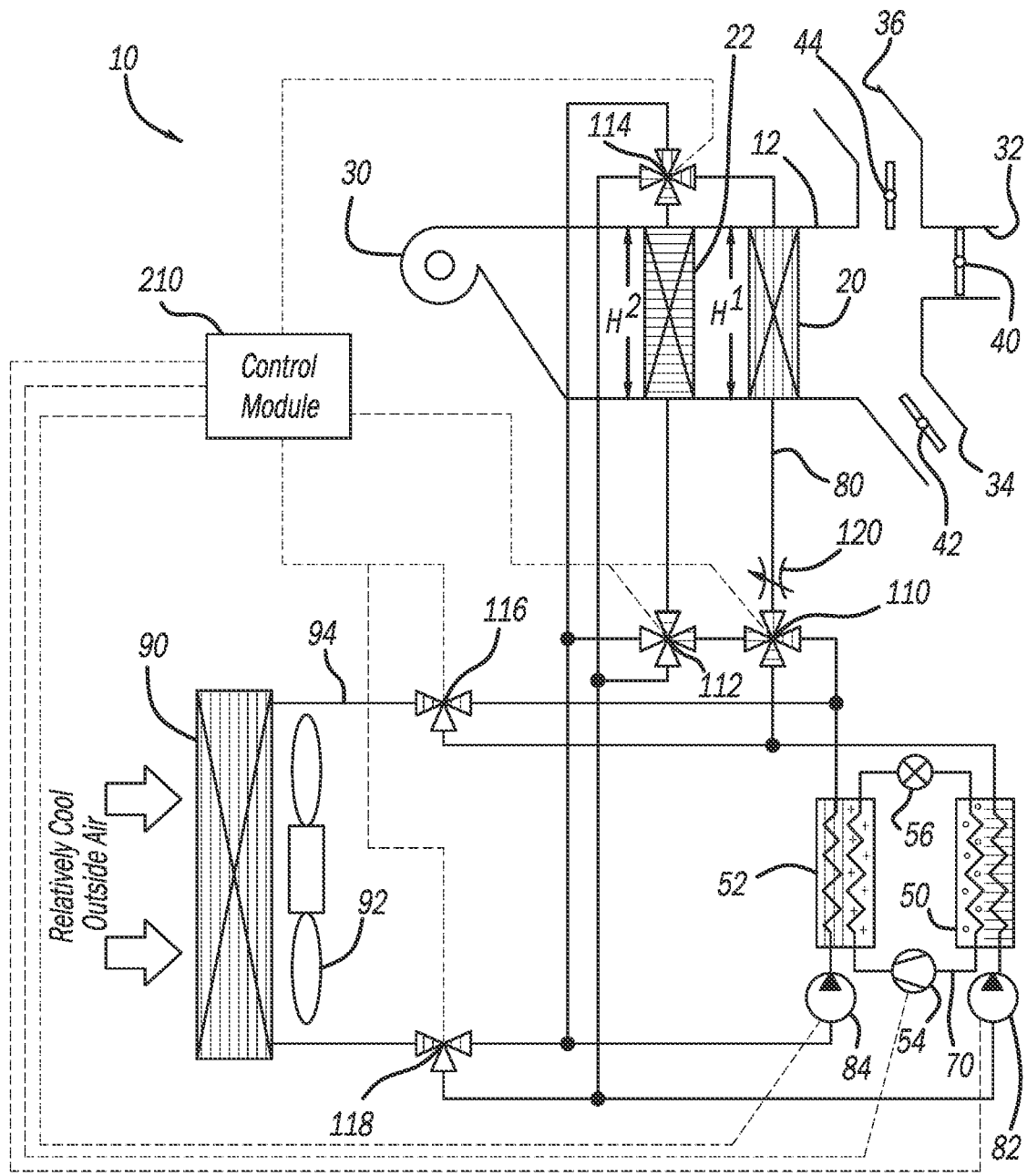
FIG. 4 illustrates the HVAC system of FIG. 1 in a cooling, dehumidify, and temperature control mode.

In the heating, dehumidify, and defog mode of FIG. 3, the control module 210 is configured to set the valves 110, 112, 114, 116, and 118 as illustrated in FIG. 3. In the heating, dehumidify, and defog mode of FIG. 3, the first valve 110 directs coolant heated by the condenser 52 to the first heat exchanger 20. The flow control device 120 is configured to control the flow of coolant to the first heat exchanger 20. The first valve 110 also directs coolant cooled by the evaporator 50 to the second heat exchanger 22. Coolant from the first heat exchanger 20 is directed by the third valve 114 back to the condenser 52. Coolant from the second heat exchanger 22 is directed by the third valve 114 back to the evaporator 50. The valves 116 and 118 are configured to circulate coolant between the evaporator 50 and the radiator 90. Thus, in the heating, dehumidify, and defog mode of FIG. 3, the first heat exchanger 20 is relatively warm and the second heat exchanger 22 is relatively cool, and the radiator 90 is exposed to relatively cold air outside of the vehicle. The speed of the compressor 54 and the speeds of the pumps 82 and 84 may also be controlled by control module 210 as appropriate for the operating condition.

The control module 210 is further configured to set the HVAC system 10 in a cooling, dehumidify, and temperature control mode, as illustrated in the example of FIG. 4. In the cooling, dehumidify, and temperature control mode the control module 210 is configured to set the valves 110, 112, 114, 116, and 118 as illustrated in FIG. 4. In the cooling, dehumidify, and temperature control mode of FIG. 4, the first, second, and third valves 110, 112, and 114 are set in the same configuration as in the heating, dehumidify, and defog mode of FIG. 3. Unlike the mode of FIG. 3, however, in the cooling, dehumidify, and temperature control mode of FIG. 4, the second coolant loop 94 is configured such that coolant flows between the radiator 90 and the condenser 52. In the air conditioning mode of FIG. 4, the radiator 90 is exposed to relatively warm air outside of the vehicle. The speed of the compressor 54 and the speeds of the pumps 82 and 84 may also be controlled by the control module 210 as appropriate for the operating condition.

Figure 5:
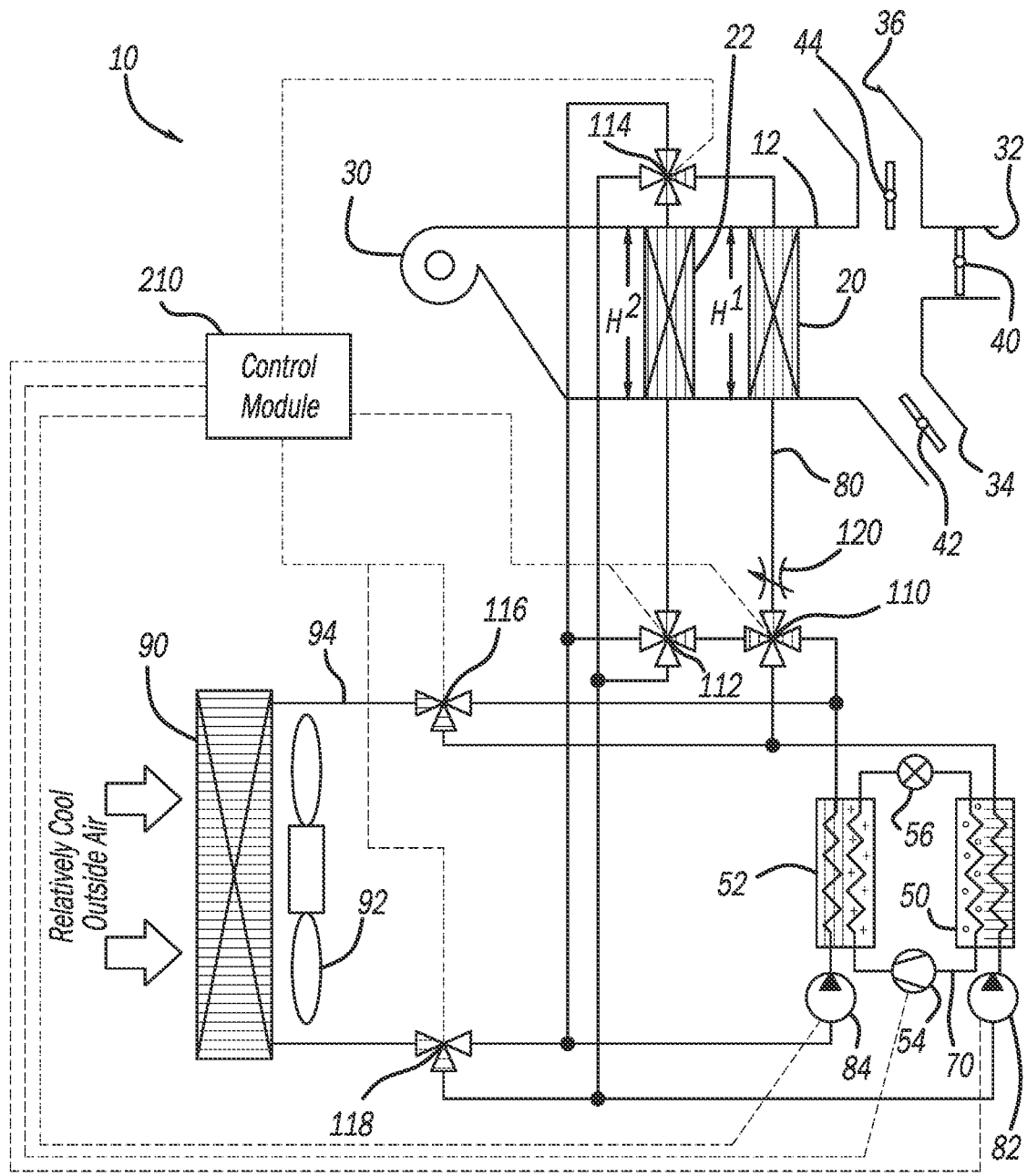
FIG. 5 illustrates a low coolant side pressure drop embodiment of the maximum hot heating mode.

With reference to FIG. 5, there may be some situations where it is desirable to minimize the coolant side pressure drop while still gaining the benefit of increased heat transfer surface of running hot coolant through both heat exchangers 20 and 22. For this alternate embodiment of the enhanced hot heating mode, the control module 210 is configured to set the valves 110, 112, 114, 116, and 118 as illustrated in FIG. 5, so that hot coolant heated as a result of flowing across the condenser 52 flows across both the first heat exchanger 20 and the second heat exchanger 22 in parallel to heat airflow to the cabin through the foot outlet 34 and to a windshield through the defrost outlet 36. The flow control device 120 is configured to control the flow of coolant to the first heat exchanger 20. After flowing in parallel across the first and second heat exchangers 20 and 22, the coolant is directed back to the condenser 52. In the alternate embodiment of enhanced hot heating mode of FIG. 5, the valve system is configured to direct chilled coolant across the evaporator 50 and the radiator 90. Thus, in the alternate embodiment of enhanced hot heating mode of FIG. 5, both the first heat exchanger 20 and the second heat exchanger 22 heat airflow passing therethrough, albeit with coolant flow through these heat exchangers in parallel, instead of in series as shown in the maximum hot heating mode of FIG. 1. Speed of the compressor 54 and the speeds of the pumps 82 and 84 may also be controlled by control module 210 to contribute to the enhanced hot heating effect.

Figure 6:
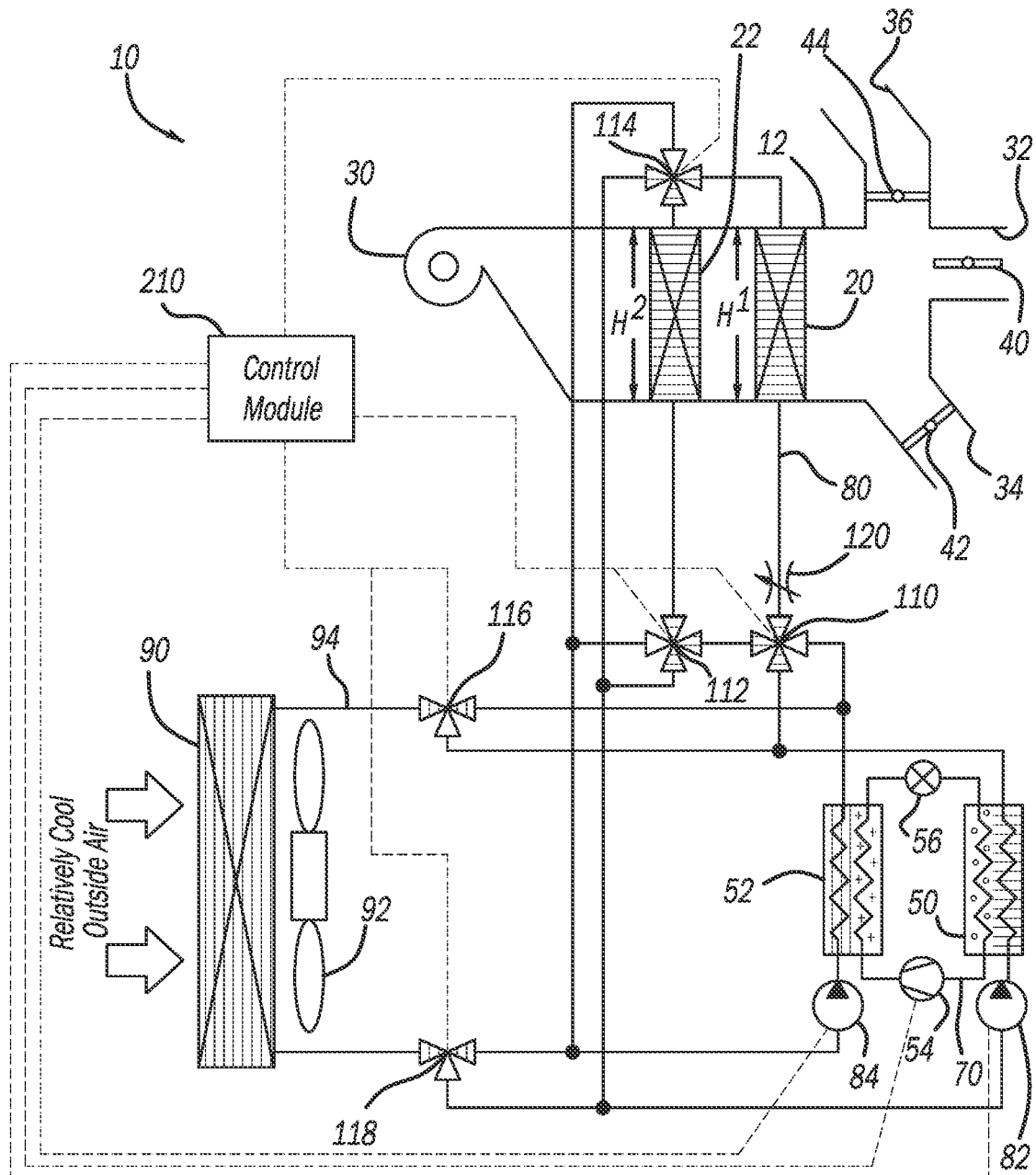
FIG. 6 illustrates a low coolant side pressure drop embodiment of the maximum cold cooling mode.

With reference to FIG. 6, there may be some situations where it is desirable to minimize the coolant side pressure drop while still gaining the benefit of increased heat transfer surface of running cold coolant through both heat exchangers 20 and 22. For this alternate embodiment of enhanced cold cooling mode of FIG. 6, the control module 210 is configured to set the valves 110, 112, 114, 116, and 118 as illustrated in FIG. 6. In the alternate embodiment of enhanced cold cooling mode of FIG. 6, coolant that has been cooled by passing across the evaporator 50 is directed by the first valve 110 to and across the first heat exchanger 20. In parallel to the flow through the first heat exchanger 20, the cooled coolant is also directed across the second heat exchanger 22 by the first valve 110 and valve 112. From the first heat exchanger 20 and the second heat exchanger 22, the valve 114 directs the coolant back to the evaporator 50. The cold coolant flowing through the first and the second heat exchangers 20, 22 cools airflow to the cabin through the face outlet 32. The fourth and fifth valves 116, 118 are configured to direct coolant between the condenser 52 and the radiator 90. Thus, in the alternate embodiment of enhanced cold cooling mode of FIG. 6, both the first heat exchanger 20 and the second heat exchanger 22 cool airflow directed across the first heat exchanger 20 and the second heat exchanger 22, albeit with coolant flow through heat exchangers 20 and 22 occurring in parallel rather than in series as shown in the maximum cold cooling mode of FIG. 2. The speed of the compressor 54 and the speeds of the pumps 82 and 84 may also be controlled by the control module 210 to contribute to and alternate embodiment of enhanced cold cooling effect.

Figure 7B:
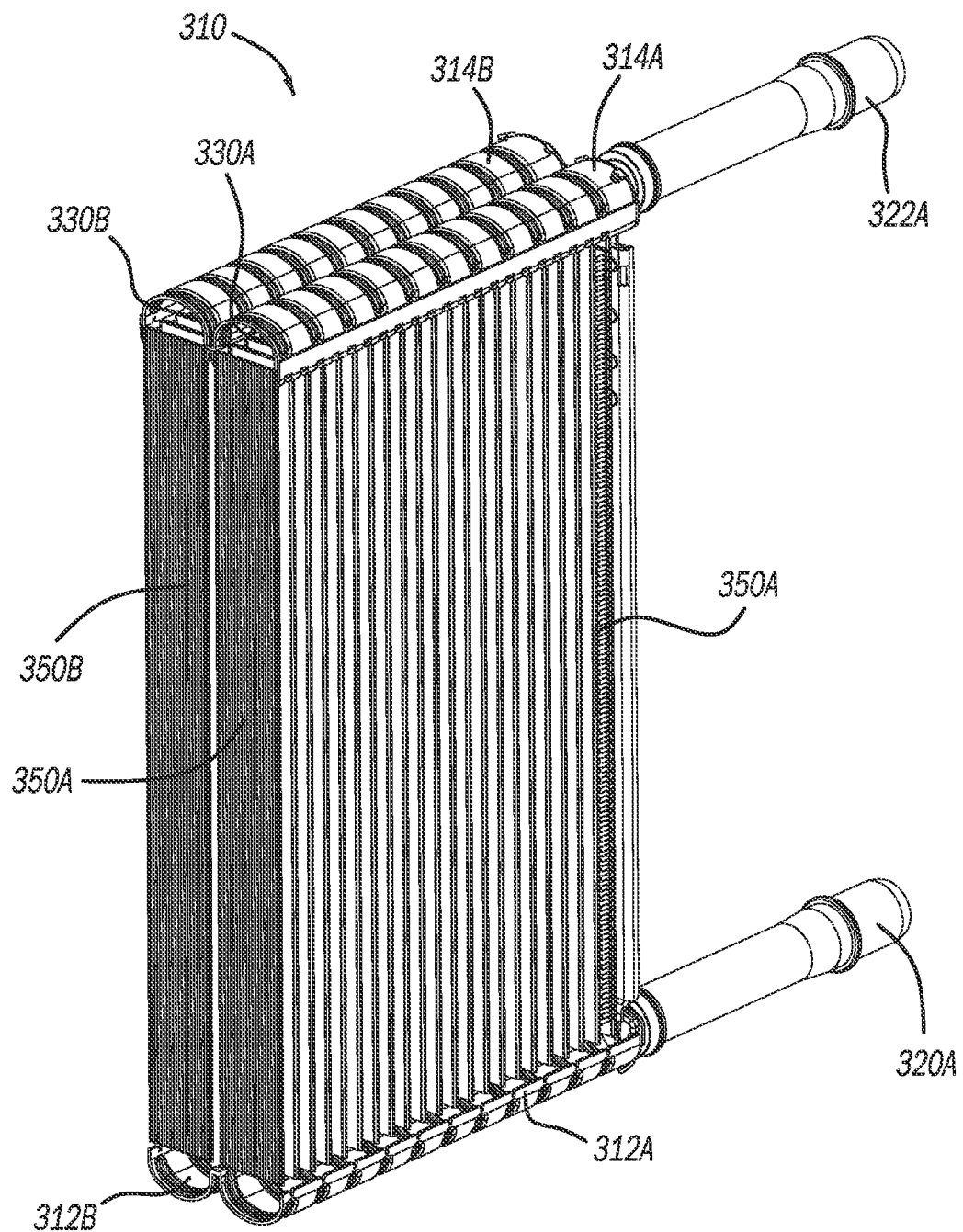
FIG. 7B is a cross-sectional view taken along line 7B-7B of FIG. 7A.

With reference to FIGS. 7A and 7B, the first heat exchanger 20 and the second heat exchanger 22 may be combined into a heat exchanger assembly 310. The heat exchanger assembly 310 performs the functionality of both the first heat exchanger 20 and the second heat exchanger 22. Specifically, the heat exchanger assembly 310 includes a first inlet tank 312A, which is adjacent to a second inlet tank 312B. A first outlet tank 314A is adjacent to a second outlet tank 314B. A first inlet conduit 320A is in fluid communication with the first inlet tank 312A to deliver coolant into the first inlet tank 312A. A second inlet conduit 320B is in fluid communication with the second inlet tank 312B to deliver coolant into the second inlet tank 312B. A first outlet conduit 322A is in fluid communication with the first outlet tank 314A to transport coolant out of the first outlet tank 314A. A second outlet conduit 322B is in fluid communication with the second outlet tank 314B to transport coolant out of the second outlet tank 314B.

Extending from the first inlet tank 312A to the first outlet tank 314A is a first row of tubes 330A. Extending from the second inlet tank 312B to the second outlet tank 314B is a second row of tubes 330B. The first row of tubes 330A transport coolant from the first inlet tank 312A to the first outlet tank 314A. The second row of tubes 330B transport coolant from the second inlet tank 312B to the second outlet tank 314B. Between each of the first tubes 330A are first fins 350A. Between each of the second tubes 330B are second fins 350B. The first fins 350A and the second fins 350B exchange heat from/to the coolant and from/to the air. A first end plate 340 and a second end plate 342 are on opposite sides of the first row of tubes 330A and the second row of tubes 330B to hold the first and the second rows of tubes 330A, 330B (as well as the tanks 312A, 312B, 314A, 314B) all together in the assembly as illustrated. The first row of tubes 330A effectively perform as the first heat exchanger 20 described above as coolant passes therethrough. The second row of tubes 330B effectively perform as the second heat exchanger 22 described above as coolant passes therethrough. Thus, the heat exchanger assembly 310 may replace the first heat exchanger 20 and the second heat exchanger 22 along the first coolant loop 80.

Figure 8:
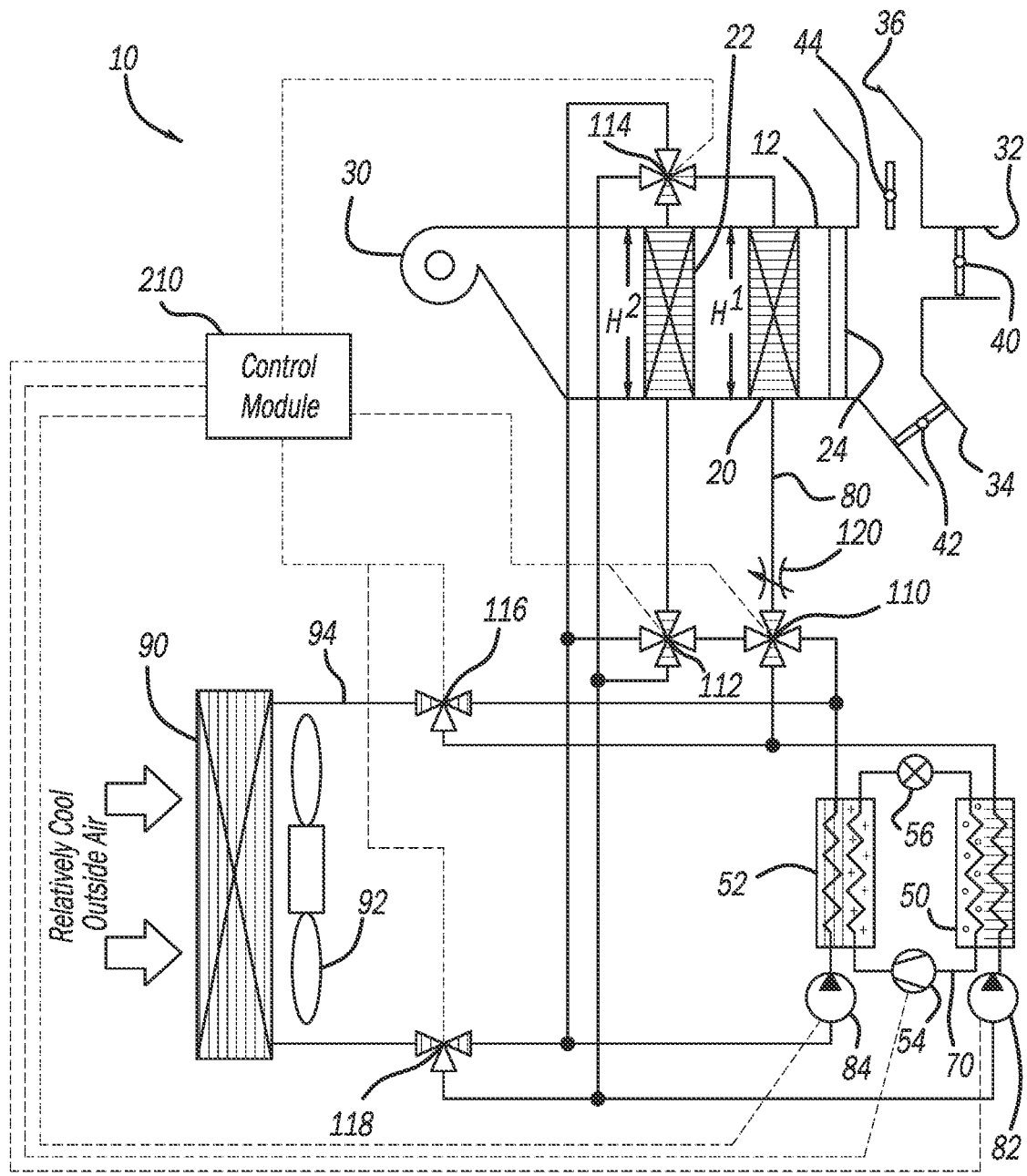
FIG. 8 illustrates the HVAC system of FIG. 1 including a heater and configured in a dehumidify and temperature control mode.

FIG. 8 illustrates an additional exemplary configuration of the HVAC system 10 in a dehumidify and temperature control mode. In the example of FIG. 8, the HVAC system 10 further includes a heater 24. The heater 24 may be any suitable heater, such as a positive temperature coefficient (PTC) heater. The heater 24 is within the HVAC case 12 downstream of the first heat exchanger 20 between the first heat exchanger 20 and the control doors 40, 42, 44. The control module 210 is configured to set the valves 110, 112, 114, 116, and 118 as illustrated in FIG. 8. As a result, coolant that has been cooled by passing across the evaporator 50 is directed by the first valve 110 to and across the first heat exchanger 20. The flow control device 120 is configured to control the flow of coolant to the first heat exchanger 20. From the first heat exchanger 20, the cooled coolant is directed across the second heat exchanger 22 by the third valve 114. From the second heat exchanger 22, the second valve 112 directs the coolant back to the evaporator 50. The air cooled as a result of passing across the first heat exchanger 20 and the second heat exchanger 22 is heated by the heater 24 to any desired temperature. The temperature of the heater 24 is controlled by the control module 210. The heated air is then directed by the control doors 40, 42, 44 through one or more of the face outlet 32, the foot outlet 34, and/or the defrost/demist outlet 36. In the example of FIG. 8, the airflow is directed entirely through the defrost/demist outlet 36. The example of FIG. 8 thus provides for dual heat exchanger dehumidification.

Figure 9:
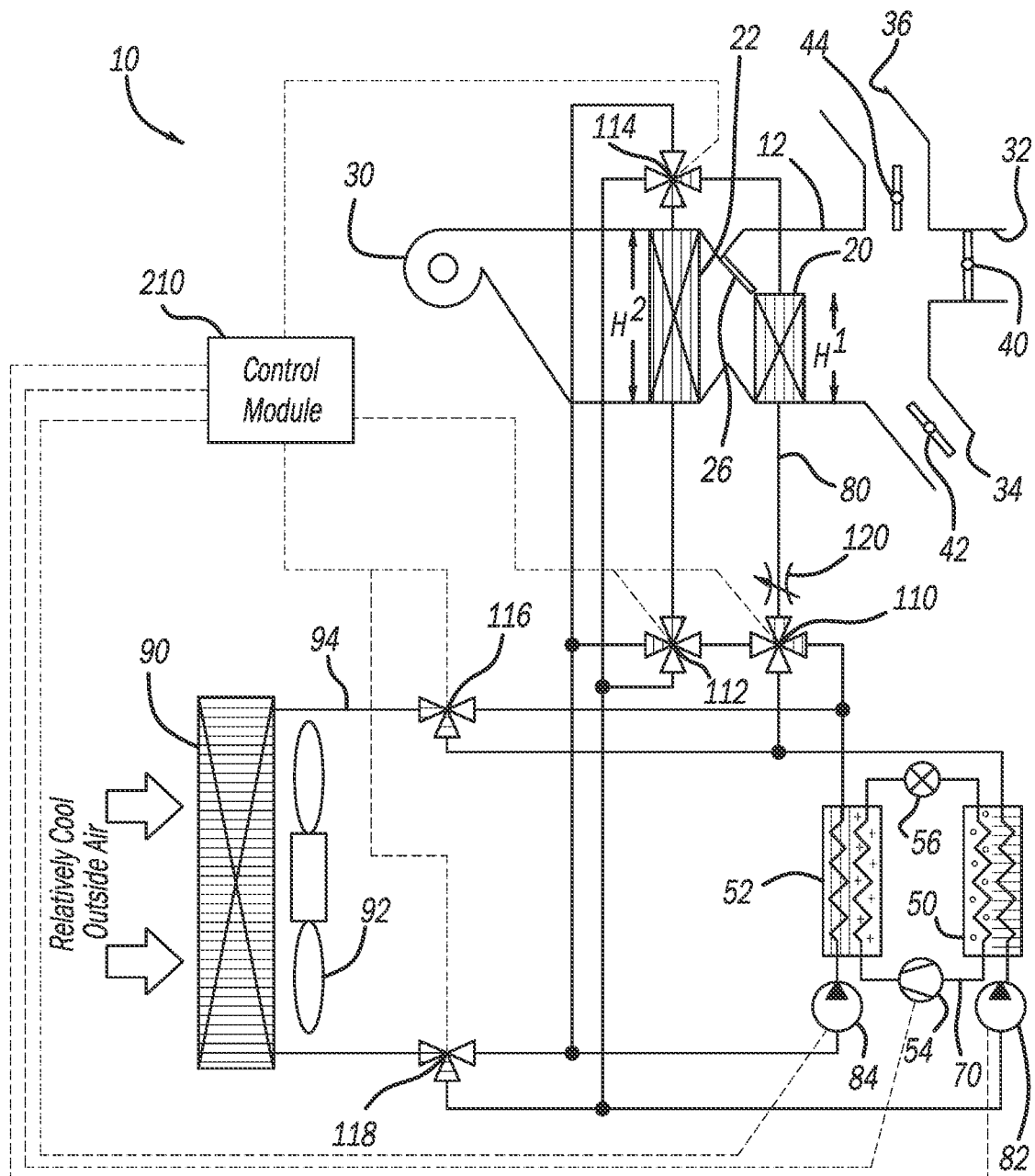
FIG. 9 illustrates an additional HVAC system in accordance with the present disclosure configured in a maximum hot heating mode.

FIG. 9 illustrates the HVAC case 12 configured with the first heat exchanger 20 having a height $H^1$ that is less than a height $H^2$ of the second heat exchanger 22. For example, the height $H^1$ may be half the height $H^2$. The HVAC system 12 further includes an air mix door 26 between the first heat exchanger 20 and the second heat exchanger 22. The air mix door 26 is movable to direct airflow from the second heat exchanger 22 entirely around the first heat exchanger 20, entirely through the first heat exchanger 20, or both through and around the first heat exchanger 20. The air mix door 26 is configured to be actuated by the control module 210 to control temperature as explained in the following examples.

FIG. 9 illustrates an exemplary maximum hot heating mode including the air mix door 26. The air mix door 26 is positioned such that all airflow heated by the second heat exchanger 22 is also heated by the first heat exchanger 20. The control module 210 is configured to set the valves 110, 112, 114, 116, and 118 as illustrated in FIG. 9, so that hot coolant heated as a result of flowing across the condenser 52 flows across both the first heat exchanger 20 and the second heat exchanger 22 in series to heat airflow directed to the cabin through the foot outlet 34 and directed to a windshield through the defrost outlet 36. After flowing across the second heat exchanger 22, the coolant is directed back to the condenser 52. In the maximum hot heating mode of FIG. 9, the valve system is configured to direct chilled coolant across the evaporator 50 and the radiator 90. Thus, in the maximum hot heating mode of FIG. 9, both the first heat exchanger 20 and the second heat exchanger 22 heat airflow passing therethrough. The speed of the compressor 54 and the speeds of the pumps 82 and 84 may also be controlled by the control module 210 to contribute to the maximum hot heating effect. The flow control device 120 is configured to control the flow of coolant to the first heat exchanger 20 to provide additional temperature control.

Figure 10:
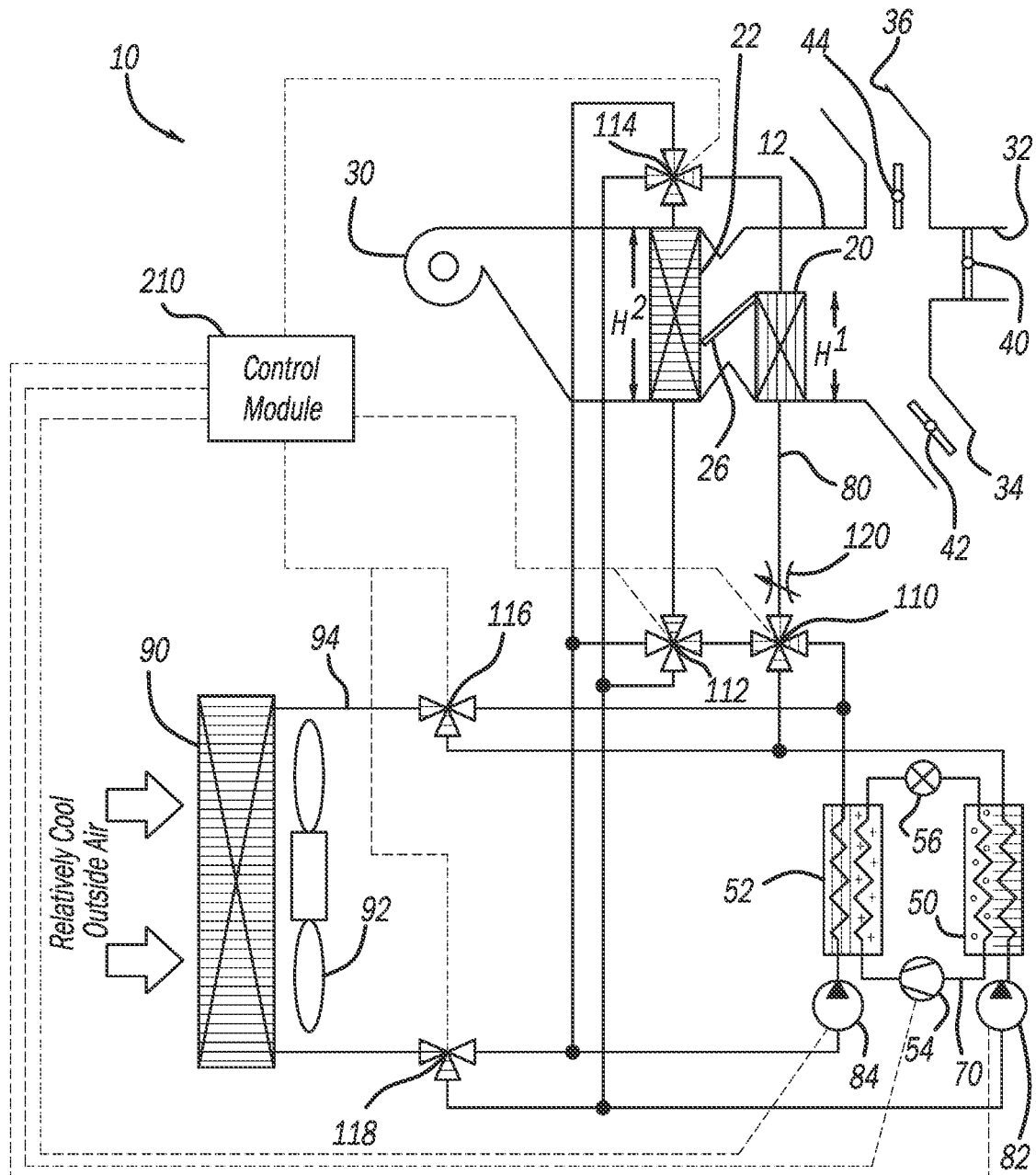
FIG. 10 illustrates the HVAC system of FIG. 9 configured in a dehumidify and temperature control mode.

FIG. 10 illustrates a dehumidify and temperature control mode including the air mix door 26. In the example of FIG. 10, the air mix door 26 is positioned by the control module 210 such that a first half of the airflow that flows across the second heat exchanger 22 is directed to the first heat exchanger 20, and a second half of the airflow that flows across the second heat exchanger 22 flows around the first heat exchanger 20. The two airstreams mix downstream of the first heat exchanger 22 to achieve a desired temperature controlled by the position of the air mix door 26. The control module 210 sets the valves 110, 112, 114, 116, and 118 as illustrated in FIG. 10 such that the first valve 110 directs coolant heated by the condenser 52 to the first heat exchanger 20. The first valve 110 also directs coolant cooled by the evaporator 50 to the second heat exchanger 22. Coolant from the first heat exchanger 20 is directed by the third valve 114 back to the condenser 52. Coolant from the second heat exchanger 22 is directed by the third valve 114 back to the evaporator 50. The valves 116 and 118 are configured to circulate coolant between the evaporator 50 and the radiator 90. Thus, in the dehumidify and temperature control mode of FIG. 10, the first heat exchanger 20 is relatively warm and the second heat exchanger 22 is relatively cool, and the radiator 90 is exposed to relatively cold air outside of the vehicle. The speed of the compressor 54 and the speeds of the pumps 82 and 84 may also be controlled by control module 210 as appropriate for the operating condition. The flow control device 120 is configured to control the flow of coolant to the first heat exchanger 20 to provide additional temperature control.

Figure 11:
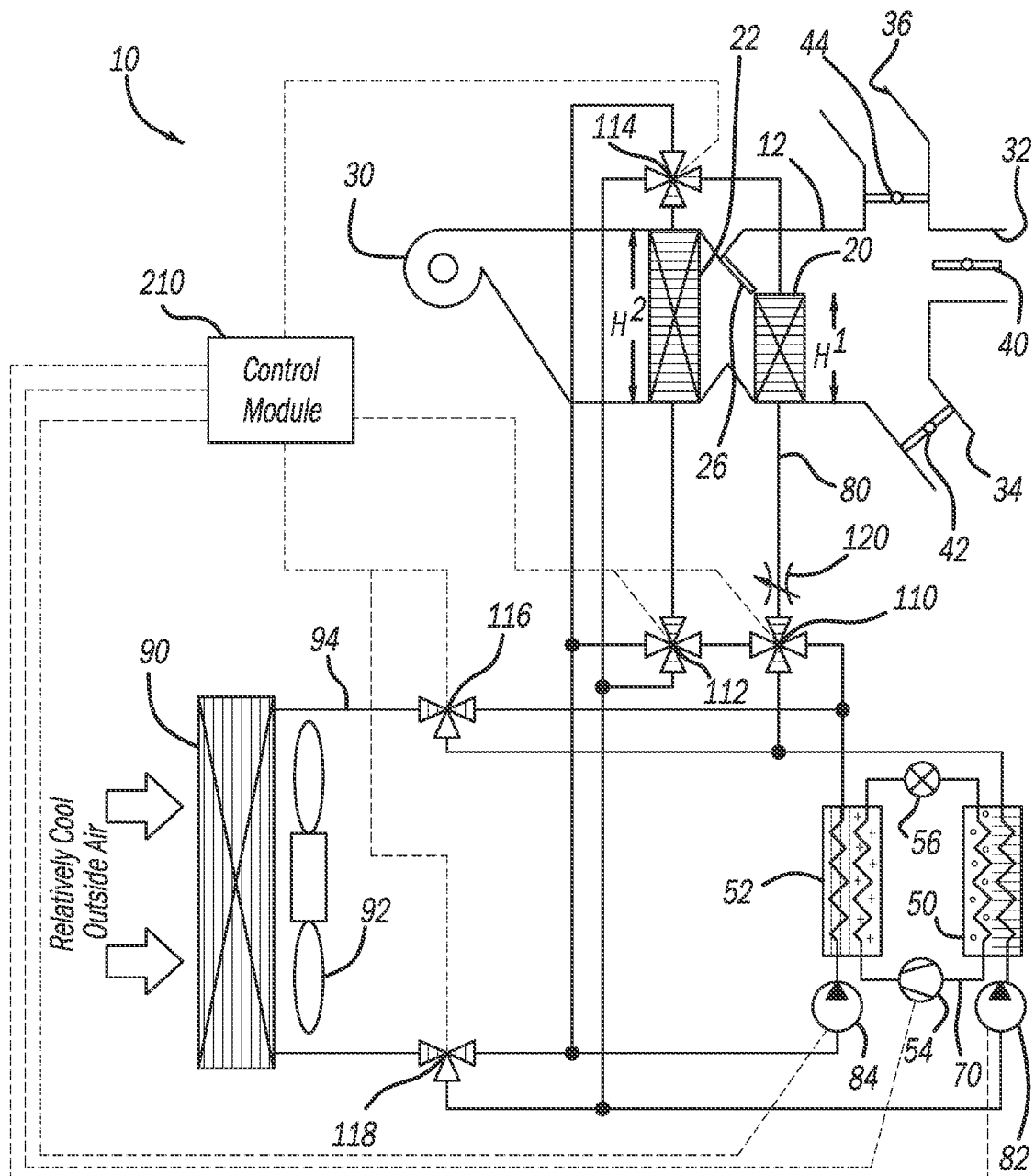
FIG. 11 illustrates the HVAC system of FIG. 9 configured in a maximum cold cooling mode.

FIG. 11 illustrates the HVAC system 10 including the air mix door 26 and configured in a maximum cold cooling mode. The control module 210 is configured to set the valves 110, 112, 114, 116, and 118 as illustrated in FIG. 11. In the maximum cold cooling mode of FIG. 11, coolant that has been cooled by passing across the evaporator 50 is directed by the first valve 110 to and across the first heat exchanger 20. From the first heat exchanger 20, the cooled coolant is directed across the second heat exchanger 22 in series with the first heat exchanger 20 by the third valve 114. From the second heat exchanger 22, the second valve 112 directs the coolant back to the evaporator 50. The cold coolant flowing through the first and the second heat exchangers 20, 22 cools airflow to the cabin through the face outlet 32. The fourth and fifth valves 116, 118 are configured to direct coolant between the condenser 52 and the radiator 90. Thus, in the maximum cold cooling mode of FIG. 11, both the first heat exchanger 20 and the second heat exchanger 22 cool airflow. The air mix door 26 is positioned such all of the airflow cooled by the second heat exchanger 22 is further cooled by the first heat exchanger 20. The control module 210 is further configured to optionally rotate the air mix door 26 to block airflow entirely through the first heat exchanger 20 to maximize airflow. The speed of compressor 54 and the speeds of the pumps 82 and 84 may also be controlled by the control module 210 to contribute to a maximum cold cooling effect. The flow control device 120 is configured to control the flow of coolant to the first heat exchanger 20 to provide additional temperature control.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A secondary loop heating, ventilation, and air conditioning (HVAC) system comprising:
    an evaporator, a condenser, an expansion valve, and a compressor;
    a refrigerant loop in fluid communication with each of the evaporator, the condenser, and the expansion valve for circulating refrigerant therethrough;
    an HVAC case including a first heat exchanger having a first height, a second heat exchanger having a second height that is greater than the first height, and an air mix door between the first heat exchanger and the second heat exchanger movable to direct airflow from the second heat exchanger to the first heat exchanger or around the first heat exchanger;
    a first coolant loop in fluid communication with the first heat exchanger, the second heat exchanger, and either the evaporator or the condenser for circulating coolant therethrough; and
    a valve system configured to control flow of the coolant through the first coolant loop;
    wherein in a maximum hot heating mode the valve system is configured to direct the coolant through the condenser, the first heat exchanger, and the second heat exchanger, and the air mix door is positioned to direct all airflow from the second heat exchanger to the first heat exchanger; and
    wherein in a maximum cold cooling mode the valve system is configured to direct the coolant through the evaporator, the first heat exchanger, and the second heat exchanger.

2. The HVAC system of claim 1, wherein the first height is half the second height.

3. The HVAC system of claim 1, wherein in the maximum cold cooling mode the air mix door is positioned to direct all airflow from the second heat exchanger to the first heat exchanger.

4. The HVAC system of claim 1, wherein in the maximum cold cooling mode the air mix door is positioned to direct all airflow from the second heat exchanger around the first heat exchanger.

5. The HVAC system of claim 1, further comprising a flow control device along a coolant line running from a first valve of the valve system to the first heat exchanger, the flow control device configured to control a rate of flow of coolant to the first heat exchanger from the first valve.

6. The HVAC system of claim 1, wherein in the maximum cold cooling mode the valve system is configured to direct the coolant through the first heat exchanger and the second heat exchanger in series.

7. The HVAC system of claim 1, wherein in the maximum hot heating mode the valve system is configured to direct the coolant through the first heat exchanger and the second heat exchanger in series.

8. The HVAC system of claim 1, wherein in a cooling mode:
    the valve system is configured to direct cooled coolant from the evaporator to and across both the first heat exchanger and the second heat exchanger in parallel, and then back to the evaporator, to cool airflow directed to a vehicle passenger cabin through a face outlet of the HVAC case; and
    the valve system is configured to direct coolant between the condenser and a radiator.

9. The HVAC system of claim 1, further comprising a heater within the HVAC case downstream of the first heat exchanger.

10. The HVAC system of claim 1, wherein the valve system includes a first valve along the first coolant loop upstream of the first heat exchanger, the first valve configured to direct the coolant to the first heat exchanger from the condenser in the maximum hot heating mode, and the first valve configured to direct the coolant to the first heat exchanger from the evaporator in the maximum cold cooling mode.

11. The HVAC system of claim 10, wherein the valve system further includes a second valve along the first coolant loop downstream of the second heat exchanger, the second valve configured to direct the coolant from the second heat exchanger back to the condenser in the maximum hot heating mode, and the second valve configured to direct the coolant from the second heat exchanger back to the evaporator in the maximum cold cooling mode.

12. The HVAC system of claim 11, wherein the valve system further includes a third valve along the first coolant loop between the first heat exchanger and the second heat exchanger, the third valve configured to direct coolant from the first heat exchanger to the second heat exchanger in both the maximum hot heating mode and the maximum cold cooling mode.

13. The HVAC system of claim 1, wherein:
    in a heating, dehumidify, and defog mode, the valve system is configured to direct coolant from the condenser through the first heat exchanger and back to the condenser, and from the evaporator through the second heat exchanger and back to the evaporator; and
    the air mix door is positioned to direct airflow from the second heat exchanger both to and around the first heat exchanger.

14. The HVAC system of claim 13, wherein:
    in a cooling, dehumidify, and temperature control mode the valve system is configured to direct coolant from the condenser through the first heat exchanger and back to the condenser, and from the evaporator through the second heat exchanger and back to the evaporator; and the air mix door is positioned to direct airflow from the second heat exchanger both to and around the first heat exchanger.

15. A secondary loop heating, ventilation, and air conditioning (HVAC) system comprising:
- an evaporator, a condenser, an expansion valve, and a compressor;
- a refrigerant loop in fluid communication with each of the evaporator, the condenser, and the expansion valve for circulating refrigerant therethrough;
- an HVAC case including a first heat exchanger, a second heat exchanger, and a heater downstream of both the first heat exchanger and the second heat exchanger;
- a first coolant loop in fluid communication with the first heat exchanger, the second heat exchanger, and either the evaporator or the condenser for circulating coolant therethrough; and
- a valve system configured to control flow of the coolant through the first coolant loop;

wherein:
- in a heating, dehumidify, and defog mode, the valve system is configured to direct coolant from the condenser through the first heat exchanger and back to the condenser, and from the evaporator through the second heat exchanger and back to the evaporator;
- in a cooling, dehumidify, and temperature control mode the valve system is configured to direct coolant from the condenser through first heat exchanger and back to the condenser, and from the evaporator through the second heat exchanger and back to the evaporator; and
- the heater is configured to heat airflow from the first heat exchanger to provide temperature control.

16. The HVAC system of claim 15, wherein in a maximum hot heating mode the valve system is configured to direct the coolant through the condenser, the first heat exchanger, and the second heat exchanger; and
wherein in a maximum cold cooling mode the valve system is configured to direct the coolant through the evaporator, the first heat exchanger, and the second heat exchanger.

17. The HVAC system of claim 15, wherein the first heat exchanger and the second heat exchanger are the same size.

18. A secondary loop heating, ventilation, and air conditioning (HVAC) system comprising:
- an evaporator, a condenser, an expansion valve, and a compressor;
- a refrigerant loop in fluid communication with each of the evaporator, the condenser, and the expansion valve for circulating refrigerant therethrough;
- an HVAC case including a first heat exchanger and a second heat exchanger, the HVAC case defining a face outlet, a foot outlet, and a defrost outlet;
- a radiator;
- a first coolant loop in fluid communication with the first heat exchanger, the second heat exchanger, and either the evaporator or the condenser for circulating coolant therethrough;
- a second coolant loop in fluid communication with the radiator and either the evaporator or the condenser to direct the coolant through the radiator;
- a valve system configured to control flow of the coolant through the first coolant loop and the second coolant loop; and
- a heater within the HVAC case downstream of the first heat exchanger and the second heat exchanger, the heater configured to provide temperature control;

wherein:
- in a maximum hot heating mode the valve system configures the first coolant loop to run through the condenser, the first heat exchanger, and the second heat exchanger, and configures the second coolant loop to run through the radiator and the evaporator; and
- in a maximum cold cooling mode the valve system configures the first coolant loop to run through the evaporator, the first heat exchanger, and the second heat exchanger, and configures the second coolant loop to run through the radiator and the condenser.

19. The HVAC system of claim 18, further comprising an air mix door between the first heat exchanger and the second heat exchanger;
wherein the first heat exchanger is shorter than the second heat exchanger such that in a bypass position the air mix door is configured to direct airflow from the second heat exchanger around the first heat exchanger, and in an intermediate position the air mix door is configured to direct airflow from the second heat exchanger both to and around the first heat exchanger.

* * * * *